(12) United States Patent
Bekiares et al.

(10) Patent No.: US 9,591,512 B2
(45) Date of Patent: Mar. 7, 2017

(54) SPATIAL QUALITY OF SERVICE PRIORITIZATION ALGORITHM IN WIRELESS NETWORKS

(71) Applicant: MOTOROLA SOLUTIONS, INC, Schaumburg, IL (US)

(72) Inventors: Tyrone D Bekiares, Park Ridge, IL (US); Bob Logalbo, Rolling Meadows, IL (US); Trent J. Miller, West Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 251 days.

(21) Appl. No.: 14/143,488

(22) Filed: Dec. 30, 2013

(65) Prior Publication Data

US 2015/0189535 A1 Jul. 2, 2015

(51) Int. Cl.
*H04W 28/02* (2009.01)
*H04W 64/00* (2009.01)
(Continued)

(52) U.S. Cl.
CPC ....... *H04W 28/0226* (2013.01); *H04W 4/023* (2013.01); *H04W 4/06* (2013.01);
(Continued)

(58) Field of Classification Search
CPC ......... H04W 28/0226; H04W 28/0268; H04W 28/0215; H04W 64/006; H04W 4/06
USPC .... 370/230, 241.1, 252, 254, 260, 312, 329, 370/338, 345; 455/3.04, 406, 414.1, 455/456.1, 456.2; 709/224, 226, 228, 709/230, 231
See application file for complete search history.

(56) References Cited

U.S. PATENT DOCUMENTS 6,665,760 B1 12/2003 Dotson
6,850,764 B1 2/2005 Patel
(Continued)

FOREIGN PATENT DOCUMENTS

EP 1324532 B1 2/2010
EP 1612992 B1 6/2010
(Continued)

OTHER PUBLICATIONS

3GPP TS 23.203 v9.2.0 Technical Specification; 3rd Generation Partnership Project; Technical Specification Group Services and System Aspects; Policy and Charging Control Architecture (Release 9); Sep. 2009; 120 pages; www.3gpp.org.
(Continued)

*Primary Examiner* — Charles C Jiang
*Assistant Examiner* — Wali Butt

(57) ABSTRACT

A method and apparatus for spatial Quality of Service (QoS) in a wireless network include determining a relative or absolute location of target devices receiving or requesting a same media stream; determining a group of the target devices within a given proximity of one another utilizing resources from the same wireless access network; for each target device in the group while the resources remain in the wireless network: determining a target device based on relative spatial distance to other target devices in the group with prioritized reception of the media stream; and granting the determined target device prioritized reception of the media stream.

17 Claims, 7 Drawing Sheets

(51) Int. Cl.
*H04W 4/06* (2009.01)
*H04W 4/02* (2009.01)
*H04W 4/08* (2009.01)

(52) U.S. Cl.
CPC ......... *H04W 4/08* (2013.01); *H04W 28/0215* (2013.01); *H04W 28/0268* (2013.01); *H04W 64/006* (2013.01)

(56) References Cited

U.S. PATENT DOCUMENTS

| | | | |
|---|---|---|---|
| 6,885,874 | B2 | 4/2005 | Grube et al. |
| 7,346,340 | B2 | 3/2008 | Purnadi et al. |
| 7,573,380 | B2 | 8/2009 | Pinder |
| 7,783,777 | B1 | 8/2010 | Pabla |
| 7,860,948 | B2 | 12/2010 | Hundscheidt |
| 8,108,623 | B2 | 1/2012 | Krishnaprasad |
| 8,116,787 | B1* | 2/2012 | Lektuai .................. H04W 4/02 370/331 |
| 8,233,435 | B2 | 7/2012 | Cordeiro |
| 8,274,928 | B2 | 9/2012 | Dykema et al. |
| 8,364,166 | B2 | 1/2013 | Soliman |
| 2003/0129985 | A1 | 7/2003 | Naden et al. |
| 2005/0124319 | A1 | 6/2005 | Williams et al. |
| 2007/0002868 | A1 | 1/2007 | Qian et al. |
| 2007/0005783 | A1* | 1/2007 | Saint-Hillaire ..... H04L 12/2803 709/230 |
| 2007/0155489 | A1 | 7/2007 | Beckley et al. |
| 2007/0243821 | A1* | 10/2007 | Hundscheidt .......... H04L 29/06 455/3.04 |
| 2008/0046963 | A1 | 2/2008 | Grayson et al. |
| 2008/0259895 | A1* | 10/2008 | Habetha ................ H04W 74/04 370/345 |
| 2009/0002237 | A1* | 1/2009 | Nonoyama ............... G01S 5/02 342/450 |
| 2009/0023458 | A1 | 1/2009 | Mountney |
| 2009/0137227 | A1 | 5/2009 | Bencheikh |
| 2009/0175223 | A1 | 7/2009 | Hall |
| 2009/0312045 | A1 | 12/2009 | Miller et al. |
| 2010/0056174 | A1* | 3/2010 | Goldberg ............ H04W 64/003 455/456.1 |
| 2010/0082810 | A1* | 4/2010 | Patel ..................... H04W 36/24 709/225 |
| 2010/0149970 | A1* | 6/2010 | Miranda ............... H04W 28/02 370/229 |
| 2010/0296387 | A1 | 11/2010 | Jain et al. |
| 2010/0332668 | A1 | 12/2010 | Shah et al. |
| 2011/0058490 | A1 | 3/2011 | Mills |
| 2011/0243076 | A1 | 10/2011 | Nguyen et al. |
| 2011/0270987 | A1 | 11/2011 | Schansker et al. |
| 2012/0007725 | A1 | 1/2012 | Penisoara |
| 2012/0026947 | A1 | 2/2012 | Miller |
| 2012/0036248 | A1 | 2/2012 | Naqvi et al. |
| 2012/0094666 | A1 | 4/2012 | Awoniyi et al. |
| 2012/0094685 | A1 | 4/2012 | Marsico |
| 2013/0010708 | A1 | 1/2013 | Abraham et al. |

FOREIGN PATENT DOCUMENTS

| | | |
|---|---|---|
| EP | 2262181 A1 | 12/2010 |
| WO | 2003069507 A1 | 1/2003 |
| WO | 2004100493 A1 | 11/2004 |
| WO | 2011116819 A1 | 3/2010 |
| WO | WO 2010140907 A1 * | 12/2010 ............ H04W 4/023 |

OTHER PUBLICATIONS

3rd Generation Partnership Project:Technical Specification Group Core Network and Terminals; Policy and Charging Control (PCC) Over S9 Reference Point; Stage 3 (Release 9), 3GPP Standard; 3GPP TS 29.215, 3rd Generation Partnership Project (EGPP), Mobile, Jun. 2010.

"3rd Generation Partnership Project:Technical Specification Group Services and System Aspects; Policy and Charging Control Architecture (Release 10)", 3GPP Standard; 3GPP TS 23.203, 3rd Generation Partnership Project (EGPP), Mobile Competence Centre; 650, Jun. 2010.

Ericsson: Role of the vPCRF"; "3GPP Draft: S2-080103_PC-CQOS_008_Discussion VPCFR Role, 3rd Generation Partnership Project (3GPP), Mobile Competence Centre; France; vol. SA WG2, No. Marina Del Rey; Jan. 9, 2008, Jan. 9, 2008; XP050262634.

PCT International Search Report Dated March 5, 2015 for Counterpart Application PCT/US2014/067257.

* cited by examiner

SPATIAL QUALITY OF SERVICE PRIORITIZATION ALGORITHM IN WIRELESS NETWORKS

BACKGROUND OF THE INVENTION

In wireless networks, Quality of Service (QoS) is required to permit a wide range of users and applications to successfully share a limited resource, i.e. wireless spectrum. Conventional systems typically define QoS as a function of user, user class, group, group class, device, device class, application, application class, and/or stream type. When a network becomes congested, a scheduling function evaluates one or more of the above criteria and prioritizes one stream of data over another. Under some circumstances, such "one dimensional" prioritization rules may prove ineffective. For example, in circumstances where a large number of collocated users, all of the same class, are consuming the same media stream. Here, conventional scheduling functions and the "one dimensional" prioritization rules fall apart. Some conventional solutions exist where a system may arbitrarily "pick" one stream to favor over another, such that at least some of the streams are satisfied, while others are intentionally dropped or starved. While this at least provides serviceable streams to some individuals, the choice of individuals in a group is effectively random. Other conventional solutions exist where the bandwidth is shared fairly resulting in poor experiences for all users in these situations.

For example, consider a cluster of collocated public safety officers all sharing the same wireless resource (e.g., an evolved Node B (eNB) sector in a LTE system), such as may be found at an incident scene. Each officer is of the same rank, and each officer's radio is subscribed to a same audio talkgroup (e.g., is receiving the same outbound push-to-talk (PTT) audio stream). Under this scenario, a scheduler cannot use simple prioritization rules to determine which stream has priority, as all of the candidate streams are of the same priority (e.g., same user class, same user group, same stream type, same application, etc.). In another example, consider a multitude of sports fans attending the same football game. Each user is trying to receive a live video telecast of the game on their tablet devices, smart phones, etc. Because of the density of users connected to the same wireless resource (e.g., a WiFi access point, LTE eNB sector, etc.), insufficient bandwidth exists to deliver the video telecast to each user requesting access.

In scenarios where prioritization rules fail to differentiate streams to an extent where it is obvious which one to prioritize, a scheduler must fall back to 'best effort' or 'fair' scheduling techniques. Such maneuvers may be less than desirable across public safety, consumer applications, and other situations. In these instances, the behavior of the system becomes effectively non-deterministic and "best effort" in nature. In a group of collocated officers, for example, random devices may intermittently receive voice frames. In the aforementioned stadium example, random devices may intermittently receive video frames. In both cases, no single media stream to any one user is intact; moreover, no consideration is given to which users are receiving media.

Accordingly, there is a need for a spatial QoS prioritization algorithm in wireless networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
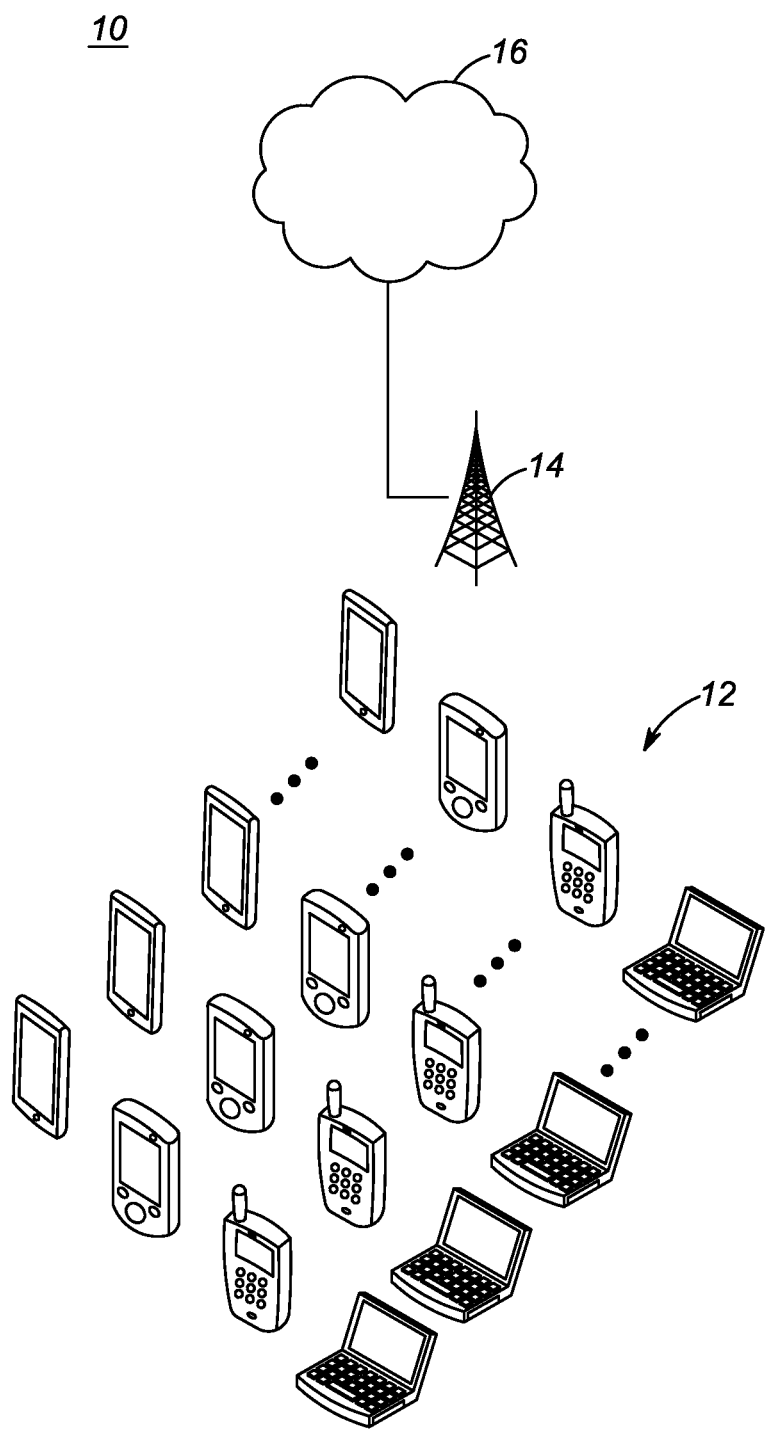
FIG. 1 is a network diagram of a wireless network describing an exemplary operational environment for the spatial QoS prioritization algorithm in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a spatial Quality of Service (QoS) method in a wireless network includes determining a relative or absolute location of target devices receiving or requesting a same media stream; determining a group of the target devices within a given proximity of one another utilizing resources from the same wireless access network; for each target device in the group while the resources remain in the wireless network: determining a target device based on relative spatial distance to other target devices in the group with prioritized reception of the media stream; and granting the determined target device prioritized reception of the media stream.

In another exemplary embodiment, a system implementing spatial Quality of Service (QoS) prioritization in a wireless network includes an interface communicatively coupled to a wireless access device; a processor; and memory storing instructions that, when executed, cause the processor to: determine a relative or absolute location of target devices receiving or requesting a same media stream from the wireless access device; determine a group of the target devices within a given proximity of one another sharing the same wireless resource; while shared wireless resource remain for the wireless access device, for each target device in the group: determine a target device based on relative spatial distance to other target devices in the group with prioritized reception of the media stream; and cause the wireless access device to grant the determined target device prioritized reception of the media stream.

In yet another exemplary embodiment, a wireless network includes a plurality of devices; a wireless access device communicatively coupled to the plurality of devices; and a scheduler implementing Quality of Service (QoS) prioritization for the plurality of devices and the wireless access device; wherein, responsive to the plurality of devices having equal priority for a media stream, the scheduler is configured to implement spatial QoS prioritization amongst the plurality of devices having equal priority.

In various exemplary embodiments, a spatial QoS prioritization algorithm in wireless networks is described. Under normal circumstances, existing prioritization mechanisms allow a scheduler to favor one stream over another based on user, user class, group, group class, device, device class, application, application class, stream type, and the like. If those mechanisms fail to identify and definitively prioritize one stream over another, the spatial QoS prioritization algorithm provides a new dimension of QoS parameter, complementary to the existing prioritization variables. Optimally, certain streams are delivered intact, while other streams may be stopped completely. Moreover, in dense situations where multiple users are consuming the same media stream, it would be advantageous to take advantage of social media sharing; e.g., one user potentially sharing their device rendering a received media stream with neighboring users interested in the same media stream via visible/audible spectrum (e.g., multiple users watching one tablet screen or listening to the same loudspeaker).

FIG. 1 is a network diagram of a wireless communication system 10 describing an exemplary operational environment for the spatial QoS prioritization algorithm. The wireless communication system 10 includes a plurality of user equipment (UE) 12 communicatively coupled to a wireless access device 14, such as a base station, (and sometimes referred to herein as wireless base station 14) via wireless connections. The wireless base station 14 is configured to interface to a network 16 providing wireless connectivity to the UEs 12 to the network 16. Variously, the UEs 12 can include, without limitation, smart phones, tablets, phablets, personal digital assistants, laptops, mobile devices, vehicular-based devices, radios, etc. That is, the UEs 12 are mobile devices configured to wireless communicate, via the wireless base station 14, with the network 16. The wireless base station 14 can be any kind of network-based wireless access device, including, without limitation, an evolved Node B (eNB), an access point, or the like. The network 16 can include the Internet, a wide area network, local area networks, subscriber networks, and/or combinations thereof.

The UEs 12 are configured to communicate with the wireless base station 14 via defined wireless spectrum using a wireless communication protocol. For example, the wireless communication protocols can include, without limitation, 3G/4G, Long Term Evolution (LTE), IEEE 802.11 (any variation), IEEE 802.16 (WiMAX or any other variation), and the like. Note, each wireless communication protocol can include QoS prioritization algorithms. As described herein, QoS is required on the wireless communication system 10 to permit the UEs 12 shared access to the limited wireless spectrum. Again, conventional QoS techniques are a function of user, user class, group, group class, device, device class, application, application class, and/or stream type. When the wireless communication system 10 becomes congested, a scheduling function evaluates one or more of the above criteria and prioritizes one stream of data over another. The scheduling function can be located at the wireless base station 14 or in a device communicatively coupled to the wireless base station 14. For example, the scheduling function can be implemented in the wireless base station 14 (e.g., as an eNB, WiFi controller, etc.), in a Policy and Charging Rules Function (PCRF) device, or the like. Again, the scheduling function decides which UE 12 receives priority over other UEs 12 in times of congestion.

In an exemplary embodiment, the wireless communication system 10 includes a large number of the UEs 12 connected to the same wireless base station 14 and streaming content from the network 16. The content may also be the same content across the large number of UEs 12. Again, the spatial QoS prioritization algorithm can advantageously be utilized in the scheduling function as another QoS parameter in situations where the UEs 12 are characterized by the same user, user class, group, group class, device, device class, application, application class, and/or stream type n parameters. As described herein, in these situations, it is difficult to prioritize the UEs 12 when the existing QoS parameters are equal or approximately equal. The spatial QoS prioritization algorithm introduces another QoS parameter, namely location of the UEs 12, absolute and/or relative location with respect to other UEs. With the spatial QoS prioritization algorithm in these situations (i.e., same user, user class, group, group class, device, device class, application, application class, and/or stream type), certain streams are delivered intact, while other streams may be stopped completely. It is an objective of the spatial QoS prioritization algorithm to determine how to differentiate the UEs 12 based on spatial distribution, either absolute location or relative location therebetween.

That is, under normal circumstances, the existing prioritization mechanisms allow the scheduling function to favor one stream over another based on user, user class, group, group class, device, device class, application, application class, and/or stream type. If those mechanisms fail to identify and definitively prioritize one stream over another, the spatial QoS prioritization algorithm can add a new dimension of QoS parameter, complementary to the existing prioritization variables. Also, in dense situations where multiple UEs 12 are subscribed to the same media stream, it would be advantageous to take advantage of social media sharing; e.g., one user potentially sharing their device or received media stream with neighboring users interested in the same media stream via visible/audible spectrum (e.g., multiple users watching one tablet screen).

Figure 2A:
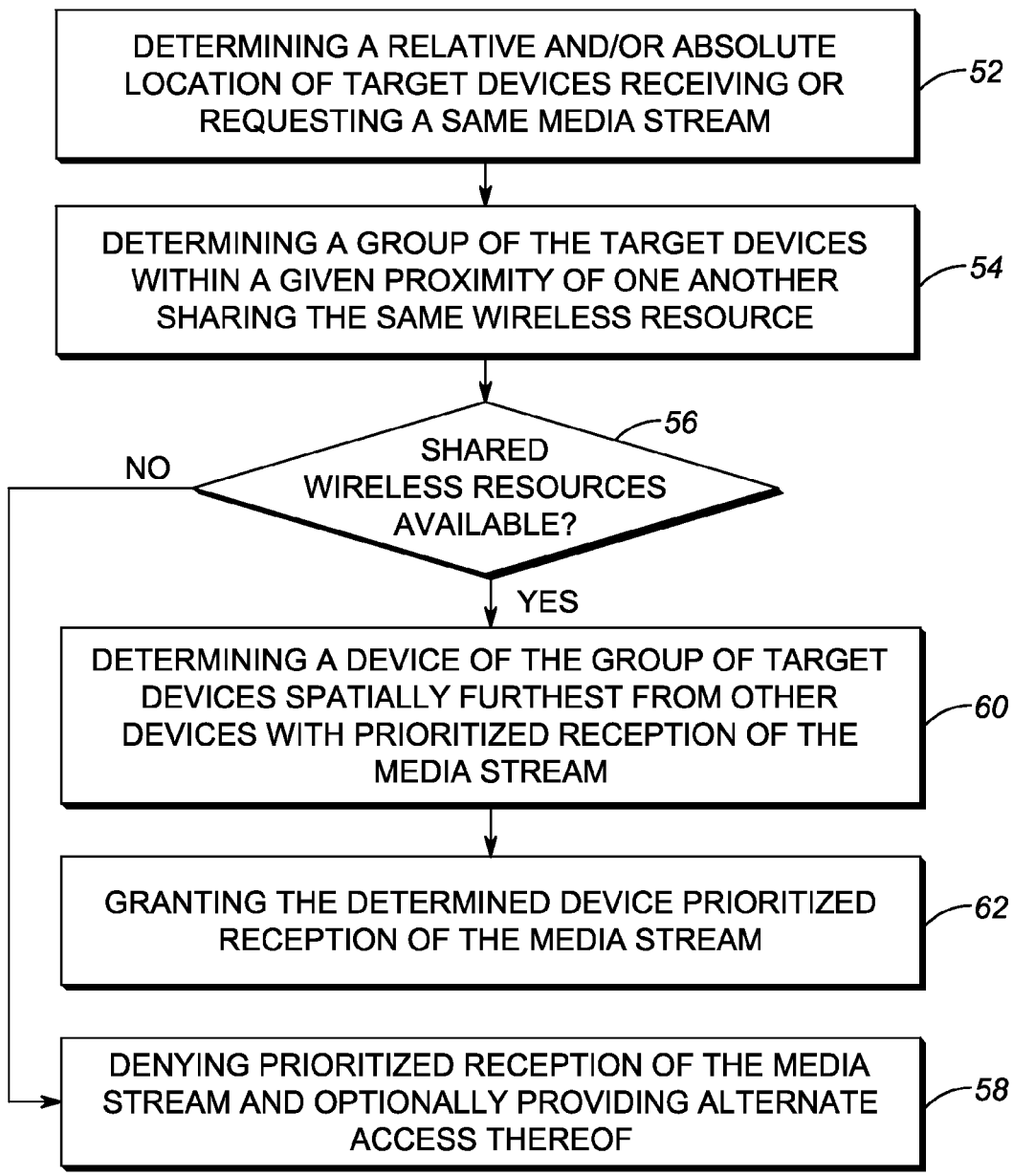
FIGS. 2A and 2B are flowchart of a spatial QoS prioritization algorithm in accordance with some embodiments.

FIG. 2A is a flowchart of a spatial QoS prioritization algorithm 50 in accordance with some embodiments. The spatial QoS prioritization algorithm 50 can be implemented with or in the wireless communication system 10. For example, the spatial QoS prioritization algorithm 50 can be implemented in the wireless base station 14 or in a device communicatively coupled to the wireless base station 14 (e.g., an LTE PCRF device, etc.). Further, the spatial QoS prioritization algorithm 50 can be implemented in a device performing the scheduling function as well as implemented with other QoS parameters. For example, the spatial QoS prioritization algorithm 50 can be used when there is a situation arising from plural users characterized by the same user, user class, group, group class, device, device class, application, application class, and/or stream type parameters, and the like.

The spatial QoS prioritization algorithm 50 includes determining a relative and/or absolute location of target devices receiving or requesting a same media stream (step 52). Here, the device implementing the spatial QoS prioritization algorithm 50 has a view of location of each of the target devices (e.g., the UEs 12). The absolute location includes the physical location, such as global positioning satellite (GPS) coordinates, triangulation from the wireless base station 14, etc. The relative location includes the location of the target device relative to other target devices serviced by the wireless base station 14. In an exemplary embodiment, the media stream can be a unicast media stream from the network 16 to the UEs 12 through the wireless base station 14. The media stream can comprise video, audio, data, or a combination thereof. Other types of media streams are also contemplated.

Methods to determine the relative location and arrangement of devices are generally known in the art. In outdoor applications, GPS absolute location is becoming increasingly accurate (potentially down to tens of centimeters). For indoor applications, LTE location service (LCS) absolute location is available. Additionally, there has been recent work to determine one device's relative location to another device using short range technologies, such as RFID, ultrasonic (e.g., comp.eprints.lancs.ac.uk/1016/1/ultrasound-.pdf), as well as standard Bluetooth and WiFi hardware operating in a peer-to-peer fashion (e.g., research.microsoft-.com/pubs/118633/msr-tr-2010-5.pdf). Finally, some multiple-input-multiple-output (MIMO)-based wireless systems have some notion of the relative spatial location of devices.

The location determining step 52 can be done ongoing with respect to the target devices, periodically, and/or responsive to implementing the spatial QoS prioritization algorithm 50. That is, the location data can be always available or obtained for implementing the spatial QoS prioritization algorithm 50. Using any appropriate locationing method, a scheduler implementing the spatial QoS prioritization algorithm 50 can now intelligently select specific individuals in a dense group of individuals to receive a given media stream in a manner which tries to ensure all interested individuals have access to the given media stream, either directly or indirectly. Thus, the spatial QoS prioritization algorithm 50 includes a spatial component, i.e. location, as a QoS parameter.

Next, the spatial QoS prioritization algorithm 50 includes determining a group of the target devices within a given proximity of one another sharing the same wireless resource (step 54). Here, the scheduler is looking for the target devices that are in close proximity to one another, based on the location determining step 52, and receiving or requesting the same media stream, and sharing the same wireless resource (e.g., the same eNodeB sector in a LTE system, the Access Point channel in a WiFi system, etc.). As described herein, the group of the target devices problematically cannot be differentiated using conventional QoS techniques since their conventional QoS characteristics are the same—it is not possible to differentiate. It is amongst the group that the spatial QoS prioritization algorithm 50 determines priority based on spatial distribution.

The spatial QoS prioritization algorithm 50 determines if shared wireless resources are available (step 56). Again, the purpose of the spatial QoS prioritization algorithm 50 is to prioritize limited resources, i.e. the shared wireless resources, in a spatial manner. If there are no shared wireless resources available (step 56), the spatial QoS prioritization algorithm 50 denies prioritized reception of the media stream and optionally provides alternate access thereof to a target device receiving or requesting the media stream (step 58). The alternate access is further described herein and generally includes providing separate opportunities for a user of target device who is denied access to receive the media stream.

If there are shared wireless resources available (step 56), the spatial QoS prioritization algorithm 50 determines a device of the group of target devices spatially furthest from other device(s) with prioritized reception of the media stream (step 60). Here, the spatial QoS prioritization algorithm 50 is selecting the device of the group based on its spatial location relative to other devices already receiving the media stream. For simplicity, the spatial QoS prioritization algorithm 50 can simply select the furthest device relative to the group. For example, based on the location determining step 52, the scheduler can determine a distance for each of the group of target devices to the other devices already receiving the media stream. For example, the other devices already receiving the media stream can have a median location that is a location central to all of the other devices already receiving the media stream. This central location can be measured relative to each device in the group, and the furthest device can be selected in the step 60. Other techniques are also contemplated.

The spatial QoS prioritization algorithm 50 can grant the determined device, from the step 60, prioritized reception of the media stream (step 62). Further, the spatial QoS prioritization algorithm 50 can iteratively perform the steps 52-62 for all of the target devices receiving or requesting the same media stream as well as periodically refresh the location data from the step 52 over time for the iterative steps of the spatial QoS prioritization algorithm 50. In this manner, the spatial QoS prioritization algorithm 50 will arrive at a spatially distributed scheme where the devices receiving the media stream are about equally spaced out over the given proximity. Notably, the users who were previously granted access may now be revoked access if they have moved closer to another individual also granted prioritized reception of the media stream.

Specifically, it is advantageous to spatially distribute prioritized reception of a given media stream throughout a collocated group of users to permit visible/audible sharing (e.g., multiple users listening to one loudspeaker). Optimally, devices receiving the media are uniformly spaced, with equidistance between users receiving the media stream. In some circumstances, it may preferable to bias the choice of devices to those with capabilities amenable for media sharing (e.g., a bigger screen or a louder speaker).

The spatial QoS prioritization algorithm 50, when determining the device spatially furthest from other devices with prioritized reception of the media stream, can also include determining the capabilities of each of the devices in the group, and select a device with capabilities suitable for sharing the media stream. The spatial QoS prioritization algorithm 50, wherein the granting the device prioritized reception of the media stream, can also include instructing the device to do one of: amplifying audio reproduction of the media stream, increasing the screen brightness, displaying a video stream full-screen, and the like.

One aspect of the spatial QoS prioritization algorithm 50 can include the alternate access. Here, it is assumed the spatial QoS prioritization algorithm 50 will properly distribute the media stream in the given proximity so that there is no clustering of users granted prioritized reception of the media stream (which can occur in random selection schemes). The spatial QoS prioritization algorithm 50, when considering candidate devices vying for prioritized reception, favors spatially diverse devices and optionally optimal hardware for media sharing with an audience (e.g., a more powerful amplifier/loudspeaker or a larger screen). The cost function proposed here balances available wireless resources vs. the average "strength" of the received media to each recipient (i.e., the amplitude/clarity of the rendered media repeated either through visible/audible spectrum).

When granting prioritized reception to a device, the spatial QoS prioritization algorithm 50 can include, for the alternate access, sending additional metadata instructing the device to amplify its loudspeaker, change its loudspeaker dispersion pattern, enable a second loudspeaker, increase its screen brightness, lower screen resolution (e.g., increase "size" of displayed objects), or display a media stream full-screen to optimize/enable for media sharing with an audience. For example, the alternate access can include instructions on where to find a user who has prioritized reception (e.g., a user 10 feet to your north has reception) such that the users can physically share devices (e.g., displayed on a tablet or smart phone with speakers on). Also, the optimal pattern for dispersing the receiving media amongst requesting recipients may be biased based on known physical limitations of the user's environment; in a stadium, for example, users are constrained to sit in chairs organized by row and section. Other embodiments are also contemplated. Also, when granting prioritized reception to a device in a group, the spatial QoS prioritization algorithm 50 can include sending a higher quality audio or video stream to improve fidelity when shared with an audience. The metadata to the device may additionally instruct the user of the device granted prioritized reception or the device itself, via audible or visual means, to share the media stream with neighboring users.

Additionally, the spatial QoS prioritization algorithm 50 can be periodically reiterated based on updated locations of the various target devices. For example, the spatial QoS prioritization algorithm 50 can be periodically reiterated when any of the following occur: devices make macro movements within the group (e.g., an officer walks from one end of the group to the other); devices perform intra-WAN handoff (e.g., move to another wireless resource); and devices change inter-WAN handoff (e.g., move to another wireless resource). In inter- and intra-WAN handoffs, users who were previously granted access may now be revoked access if they have moved closer to another individual also granted prioritized reception of the media stream.

Figure 2B:
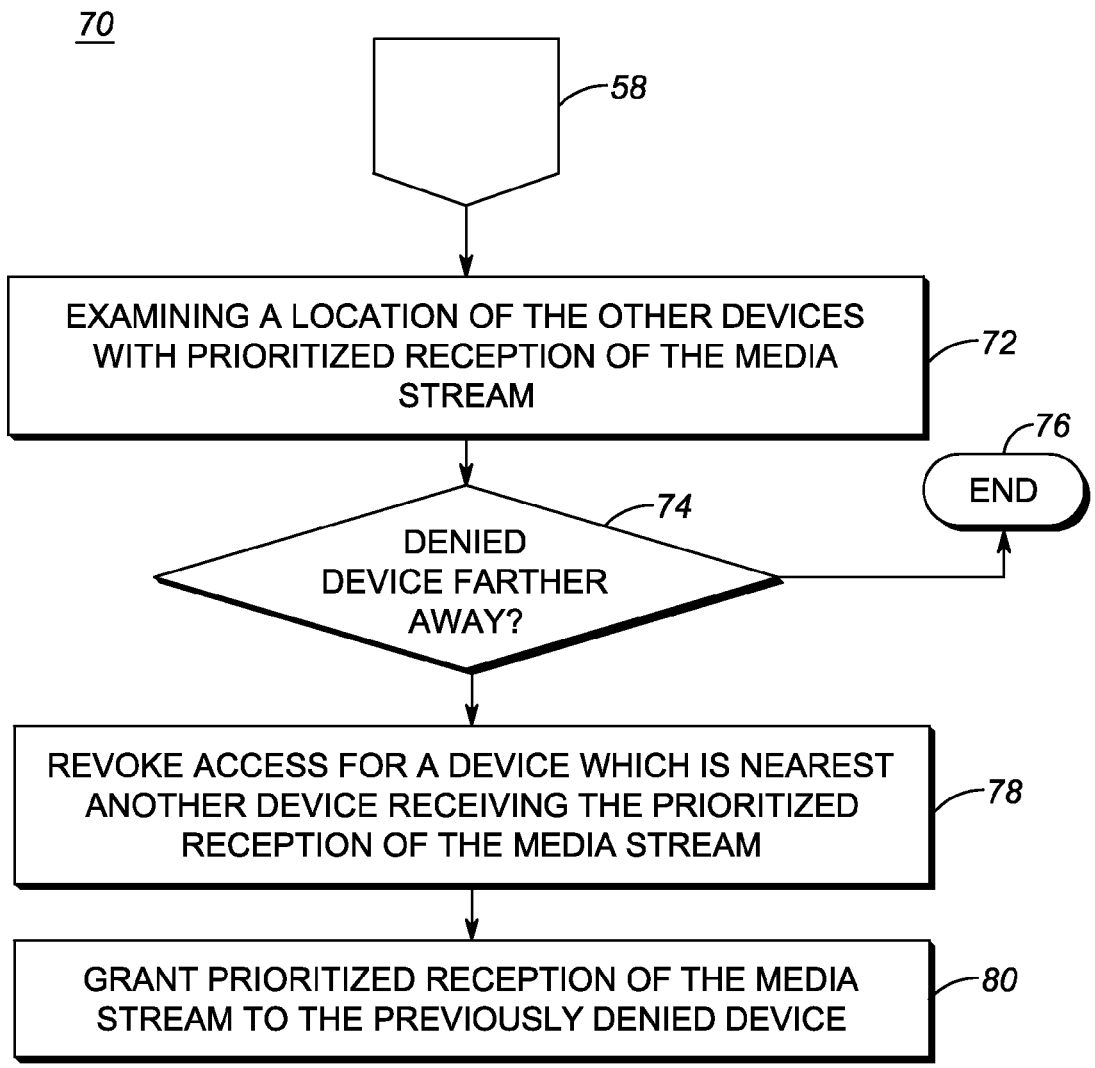

FIG. 2B is a flowchart of a spatial QoS prioritization update algorithm 70 in accordance with some embodiments. The spatial QoS prioritization update algorithm 70 can be implemented with or in the wireless communication system 10 as well as be implemented in conjunction with the spatial QoS prioritization algorithm 50. The spatial QoS prioritization update algorithm 70 can be implemented after the step 58 in the spatial QoS prioritization algorithm 50 where a device is denied prioritized reception of the media stream. The spatial QoS prioritization update algorithm 70 can examine (step 72) the current location of all devices currently receiving the stream. If the new, denied device has a distance from a closest device closer than the distance between any two devices currently receiving the stream (step 74), then the spatial QoS prioritization update algorithm 70 ends (step 76). If the new, denied device has a distance from a closest device further than the distance between any two devices currently receiving the stream (step 74), the spatial QoS prioritization update algorithm 70 can revoke access for a device which is nearest another device receiving the stream (step 78), and grant access to this new furthest device (step 80).

Figure 3:
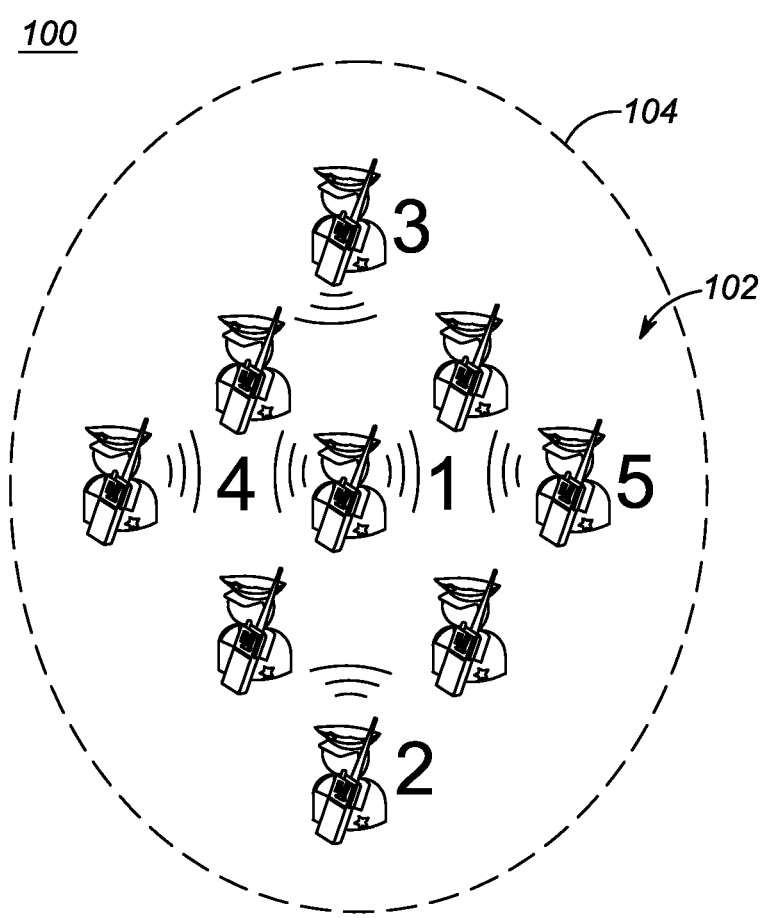
FIG. 3 is a network diagram of a public safety example implementing the spatial QoS prioritization algorithm of FIGS. 2A and 2B in accordance with some embodiments.

FIG. 3 is a network diagram of a public safety example 100 implementing the spatial QoS prioritization algorithm 50. In the public safety example 100, if insufficient network resources exist to provide talkgroup audio to all users 102 in a collocated group 104, then it is advantageous to provide talkgroup audio to devices which are well dispersed in the group. Assuming the devices are equipped with loudspeakers, each device can effectively project the received audio stream to multiple users. In the public safety example 100, the spatial QoS prioritization algorithm 50 grants prioritized reception to officers in the order indicated by the numbers. The officers without numbers were not granted prioritized reception of the media stream, and can utilize the alternate access.

Figure 4:
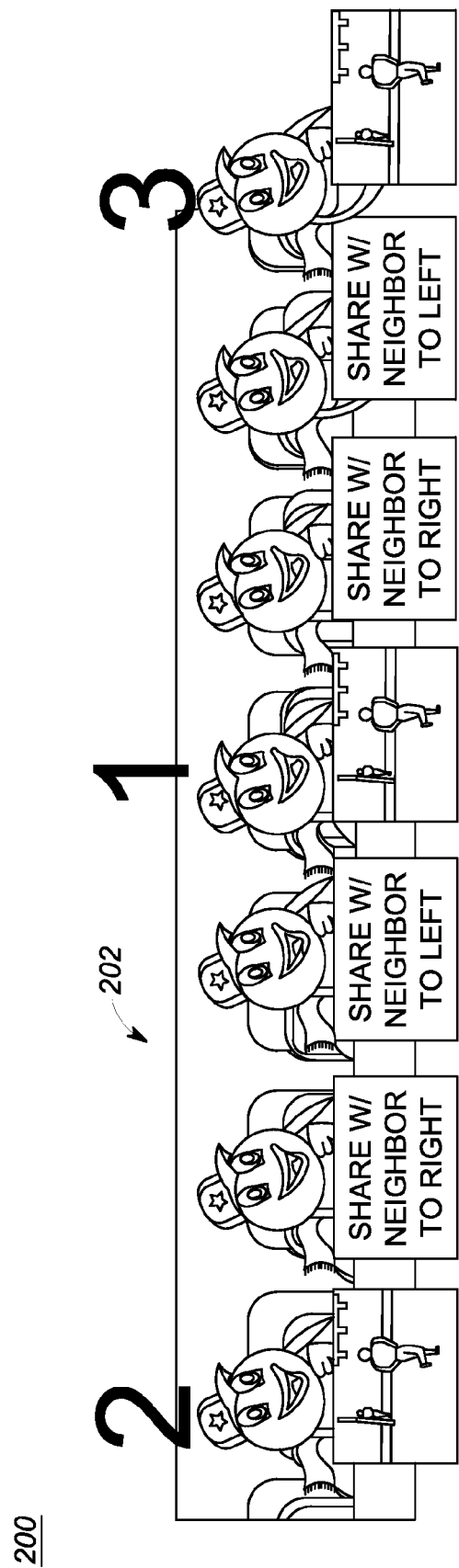
FIG. 4 is a diagram of a stadium example implementing the spatial QoS prioritization algorithm of FIGS. 2A and 2B in accordance with some embodiments.

FIG. 4 is a diagram of a stadium example 200 implementing the spatial QoS prioritization algorithm 50. The stadium example 200 includes a plurality of users 202 in a same row of seats. In the stadium example 200, if insufficient bandwidth exists to provide the video telecast to all the users 202 in the stadium, it is advantageous to provide the video telecast to every N individual. In this configuration, neighboring users may be asked to share a single video telecast (where one user looks over the shoulder of the other). In the stadium example 200, the spatial QoS prioritization algorithm 50 granted prioritized reception to fans in the order indicated by the numbers. The fans without numbers were not granted prioritized reception of the media stream, and are expected to 'look over the shoulder' of neighboring fans (this could be indicated on their tablets).

Advantageously with the spatial QoS prioritization algorithm 50, the media stream will be optimally distributed, in a spatial fashion, amongst a collocated group of individuals all attempting to receive the same media stream. Users who are not granted prioritized reception may listen/watch the stream on a neighboring peer's device.

The spatial QoS prioritization algorithm 50 can be used if media streams remain undifferentiated after applying the known prioritization criteria. Alternatively, the spatial QoS prioritization algorithm 50 can be used as another QoS parameter. The spatial QoS prioritization algorithm 50 prevents a system from delivering intermittent service to each user in a group of users (default, non-deterministic behavior); and non-optimally selecting users in a group of users to receive media (default, non-deterministic behavior). Employing the spatial QoS prioritization algorithm 50 maximizes use of wireless resources, ensuring that all users effectively gain access to a given media stream (directly or indirectly), regardless of available bandwidth.

The spatial QoS prioritization algorithm 50 is enabled without hardware modification to existing infrastructure or client devices, and without modification to existing applications. All modifications could be constrained to a LTE PCRF function, or to a service above the PCRF which employs the standard Rx interface to modify QoS parameters of media streams. In either case, it is assumed that the function would have access to device location information.

Figure 5:
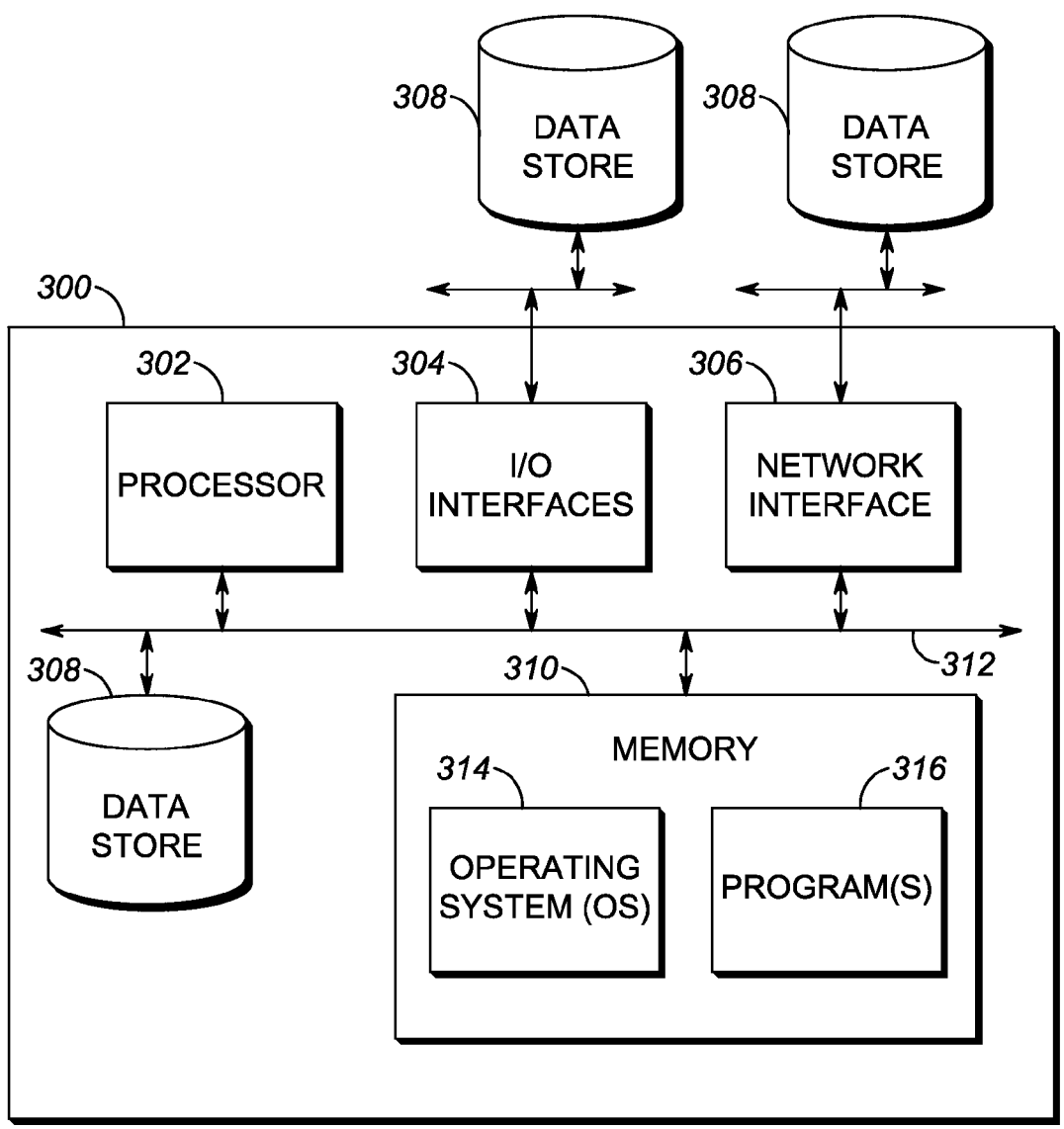
FIG. 5 is a block diagram of a server which may be used in the wireless network of FIG. 1, in other systems, or standalone to implement the spatial QoS prioritization algorithm of FIGS. 2A and 2B in accordance with some embodiments.

FIG. 5 is a block diagram of a server 300 which may be used in the wireless communication system 10, in other systems, or standalone to implement the spatial QoS prioritization algorithm 50. For example, the server 300 can be part of the wireless access device 14, such as an eNB, or can be included in a WIFI controller, an LTE PCRF function, or the like. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components, such as to the wireless base station 14 for granting prioritized reception. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein. Specifically, the spatial QoS prioritization algorithm 50 can be implemented via the one or more programs 316.

Figure 6:
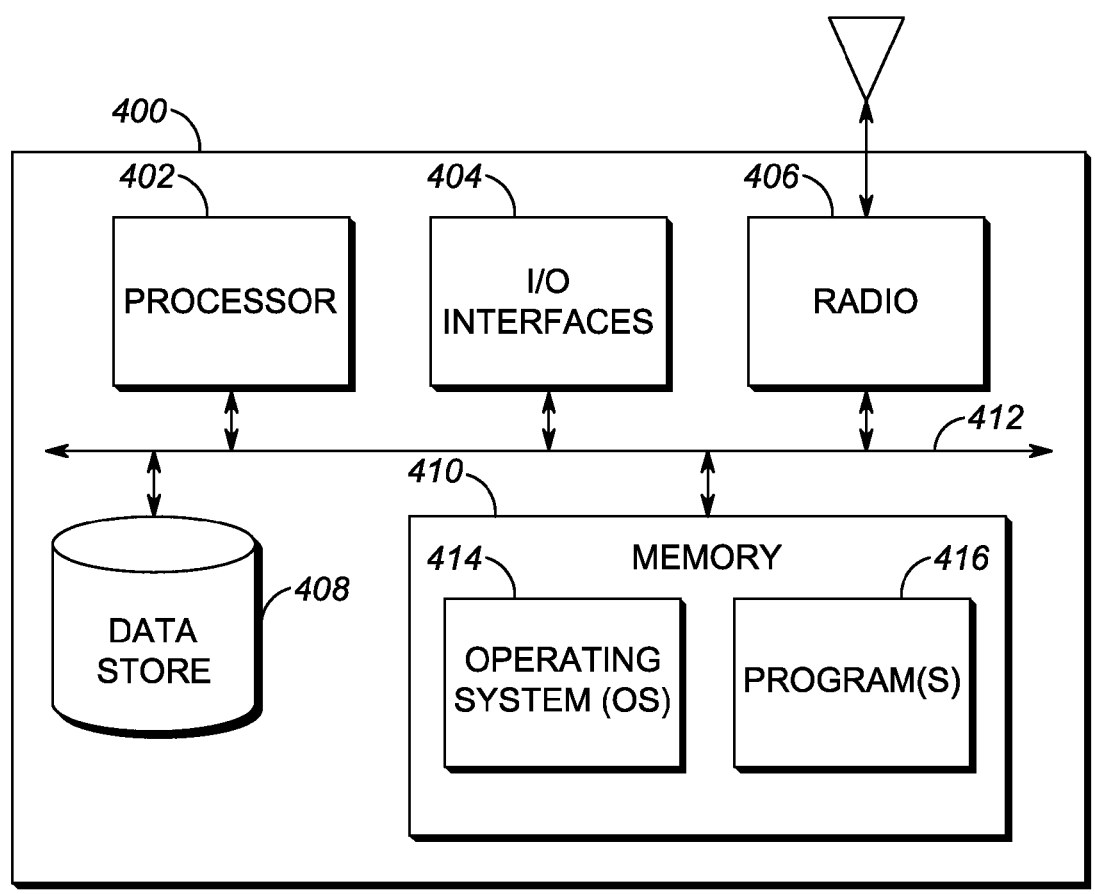
FIG. 6 is a block diagram of a mobile device, which may be used in the wireless network of FIG. 1 or the like in accordance with some embodiments.

FIG. 6 is a block diagram of a mobile device 400, which may be used in the wireless communication system 10 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 6 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network such as to the wireless base station 14. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. Additionally, the radio 406 can be configured to operate multiple protocols such as, for example, LTE and WIFI. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the wireless communication system 10.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A spatial Quality of Service (QoS) method in a wireless network, comprising:
    determining a relative or absolute location of target devices receiving or requesting a identical media stream;
    determining a group of the target devices within a given proximity of one another utilizing a identical wireless resource from the identical wireless access network;
    for each target device in the group while the resources remain in the wireless network:
    determining a furthest target device from other devices within the group; and
    granting the determined furthest target device prioritized QoS reception of the identical media stream so that the identical media stream is delivered intact to the furthest target device; and
    stopping transmission of the identical media stream to other devices.

2. The spatial Quality of Service (QoS) method of claim 1 further comprising the step of determining capabilities for the group of target devices, wherein the capabilities comprise audio and video capabilities for physically sharing the identical media stream or alternative wireless communication for rebroadcasting the identical media stream outside the wireless network.

3. The spatial Quality of Service (QoS) method of claim 1, further comprising:
    causing the determined device to perform one of: amplifying the identical media stream displaying the media full-screen, increasing the screen brightness, or turning on a radio repeater function subsequent to granting the determined target device prioritized reception of the identical media stream.

4. The spatial Quality of Service (QoS) method of claim 1, further comprising:
    performing the determining steps and the granting step subsequent to determining a plurality of conventional prioritization rules provide a identical priority for the target devices.

5. The spatial Quality of Service (QoS) method of claim 1, further comprising:
    determining the relative or absolute location of target devices through one of global positioning satellite (GPS) coordinates or Long Term Evolution (LTE) location service (LCS).

6. The spatial Quality of Service (QoS) method of claim 1, further comprising:
    determining the target device spatially furthest through determining a distance of the target device from a median location of the other target devices in the group with prioritized reception of the identical media stream.

7. The spatial Quality of Service (QoS) method of claim 6, further comprising:
    randomly selecting the target device from a plurality of target devices if it is determine the plurality of target devices are of equal distance from the median location.

8. The spatial Quality of Service (QoS) method of claim 1, further comprising:
    when the shared wireless resource do not remain in the wireless network, denying target device prioritized reception of the identical media stream.

9. The spatial Quality of Service (QoS) method of claim 8, further comprising:
    instructing the denied target devices on how to receive the prioritized reception of the identical media stream through alternate access.

10. The spatial Quality of Service (QoS) method of claim 8, further comprising:
    examining a current location of all target devices currently receiving the stream;
    if the denied target device has a distance from a closest target device further than the distance between any two target devices currently receiving the stream, then revoking access for a target device which is nearest another target device receiving the stream, and granting access to this new furthest target device.

11. The spatial Quality of Service (QoS) method of claim 1, further comprising:
    performing the determining steps and the granting step in an evolved Node B or in a Policy and Charging Rules Function (PCRF) device.

12. A system implementing spatial Quality of Service (QoS) prioritization in a wireless network, comprising:
    an interface communicatively coupled to a wireless access device;
    a processor; and
    memory storing instructions that, when executed, cause the processor to:
    determine a relative or absolute location of target devices receiving or requesting a identical media stream from the wireless access device;
    determine a group of the target devices within a given proximity of one another sharing the identical wireless resource;
    while shared wireless resource remain for the wireless access device, for each target device in the group:
    determine a target device that is a furthest spatial distance to other target devices in the group with prioritized reception of the identical media stream; and
    cause the wireless access device to grant the determined target device that is the furthest special distance to other target devices prioritized QoS reception of the identical media stream so that the identical media stream is delivered intact to the furthest target device; and
    stopping transmission of the identical media stream to other devices.

13. The system of claim 12, wherein the instructions, when executed, further cause the processor to:

cause the determined target device to perform one of: amplifying the identical media stream increasing the screen brightness, or turning on a radio repeater function subsequent to granting the determined target device prioritized reception of the identical media stream.

14. The system of claim 12, wherein the instructions, when executed, further cause the processor to:
perform the determine steps and the grant step subsequent to determining a plurality of conventional prioritization rules provide a identical priority for the target devices.

15. The system of claim 12, wherein the instructions, when executed, further cause the processor to:
determine the target device spatially furthest through determining a distance of the target device from a median location of the other target devices in the group with prioritized reception of the identical media stream.

16. The system of claim 12, wherein the instructions, when executed, further cause the processor to:
when the shared wireless resource do not remain in the wireless network, cause the wireless access device to deny target device prioritized reception of the identical media stream; and
instruct the denied target devices on how to receive the prioritized reception of the identical media stream through alternate access.

17. The system of claim 12, wherein the instructions, when executed, further cause the processor to:
periodically update the granted target devices in the group with prioritized reception of the identical media stream based on macro-movements in the given proximity and wireless handoffs.

\* \* \* \* \*